(12) United States Patent
Dwyer

(10) Patent No.: US 10,589,670 B2
(45) Date of Patent: Mar. 17, 2020

(54) STEERING ASSEMBLY INDICATOR SYSTEM FOR A LAWN CARE OR ZERO-TURN VEHICLE

(71) Applicant: HUSQVARNA AB, Huskvarna (SE)

(72) Inventor: Sean Dwyer, Gastonia, NC (US)

(73) Assignee: HUSQVARNA AB, Huskvarna (SE)

( * ) Notice: Subject to any disclaimer, the term of this patent is extended or adjusted under 35 U.S.C. 154(b) by 635 days.

(21) Appl. No.: 15/287,073

(22) Filed: Oct. 6, 2016

(65) Prior Publication Data

US 2017/0021766 A1 Jan. 26, 2017

Related U.S. Application Data

(63) Continuation of application No. 14/354,752, filed as application No. PCT/US2011/058235 on Oct. 28, 2011, now Pat. No. 9,491,903.

(51) Int. Cl.
*B60Q 9/00* (2006.01)
*A01D 34/82* (2006.01)
(Continued)

(52) U.S. Cl.
CPC ............. *B60Q 9/00* (2013.01); *A01D 34/001* (2013.01); *A01D 34/82* (2013.01); *A01D 34/824* (2013.01); *B60K 35/00* (2013.01); *B62D 1/046* (2013.01); *B62D 1/12* (2013.01); *G07C 5/0825* (2013.01); *A01D 34/64* (2013.01);
(Continued)

(58) Field of Classification Search
CPC ...... B60Q 9/00; A01D 34/824; A01D 34/001; A01D 34/82; A01D 34/64; A01D 2101/00; B60K 35/00; B60K 2350/352; B60K 2350/928; B60K 2350/357; B60K 2370/782; B60K 2370/589; B60K 2370/52; G07C 5/0825; B62D 1/046; B62D 1/12

See application file for complete search history.

(56) References Cited

U.S. PATENT DOCUMENTS 4,447,860 A 5/1984 Stone et al.
4,483,072 A 11/1984 Nagashima et al.
(Continued)

FOREIGN PATENT DOCUMENTS

CN 1429162 A 7/2003
CN 1486902 A 4/2004
(Continued)

OTHER PUBLICATIONS

International Search Report and written opinion of PCT/US2011/058235 dated Mar. 8, 2012, all enclosed pages cited.
(Continued)

*Primary Examiner* — Brian Wilson
(74) *Attorney, Agent, or Firm* — Burr & Forman LLP

(57) ABSTRACT

A riding lawn care vehicle may include a steering assembly and an indicator system may be incorporated into a portion of the steering assembly. The steering assembly, which may be, for example, a steering lever on a zero-turn vehicle, is coupled to a mechanism to move at least one wheel, and the indicator system may includes at least one illuminating element and/or display device that is configured to visually communicate information to an operator in response to detection of a predetermined trigger or condition occurring.

13 Claims, 12 Drawing Sheets

(51) Int. Cl.

| | | |
|---|---|---|
| *B62D 1/04* | (2006.01) | |
| *B62D 1/12* | (2006.01) | |
| *A01D 34/00* | (2006.01) | |
| *G07C 5/08* | (2006.01) | |
| *B60K 35/00* | (2006.01) | |
| *A01D 34/64* | (2006.01) | |
| *A01D 101/00* | (2006.01) | |

(52) U.S. Cl.
CPC ...... *A01D 2101/00* (2013.01); *B60K 2370/52* (2019.05); *B60K 2370/589* (2019.05); *B60K 2370/782* (2019.05)

(56) References Cited

U.S. PATENT DOCUMENTS

| | | | |
|---|---|---|---|
| 5,552,761 | A | 9/1996 | Kazyaka |
| 6,320,497 | B1 | 11/2001 | Fukumoto et al. |
| 6,693,523 | B1 | 2/2004 | Abel et al. |
| 6,983,583 | B2 | 1/2006 | Bucher |
| 7,012,515 | B2 | 3/2006 | Yamamoto et al. |
| 7,017,704 | B2 | 3/2006 | Kapaan et al. |
| 7,270,200 | B2 | 9/2007 | Goto et al. |
| 7,321,294 | B2 | 1/2008 | Mizumaki |
| 7,987,030 | B2 | 7/2011 | Flores et al. |
| 8,160,784 | B2 | 4/2012 | Fukumoto |
| 8,165,759 | B2 | 4/2012 | Boylston et al. |
| 8,352,116 | B2 | 1/2013 | Boylston et al. |
| 8,482,430 | B2* | 7/2013 | Szczerba ............ G01C 21/3626 340/435 |
| 2005/0108999 | A1* | 5/2005 | Bucher ................. A01D 75/28 56/10.2 R |
| 2005/0217230 | A1 | 10/2005 | Bucher |
| 2006/0155582 | A1 | 7/2006 | Brown |
| 2006/0196159 | A1 | 9/2006 | Daly et al. |
| 2006/0229770 | A1* | 10/2006 | Strong ................... B60L 50/50 701/1 |
| 2006/0271261 | A1 | 11/2006 | Flores et al. |
| 2007/0283864 | A1* | 12/2007 | Hattori ................. B63B 35/731 114/55.57 |
| 2008/0018269 | A1 | 1/2008 | Wyatt et al. |
| 2008/0023254 | A1* | 1/2008 | Prost-Fin ............... B60K 35/00 180/400 |
| 2008/0220718 | A1 | 9/2008 | Sakamoto et al. |
| 2008/0277188 | A1 | 11/2008 | Hauser et al. |
| 2009/0040061 | A1 | 2/2009 | Golunski et al. |
| 2009/0248258 | A1 | 10/2009 | Fukumoto |
| 2011/0153160 | A1 | 6/2011 | Hesseling et al. |
| 2011/0187518 | A1 | 8/2011 | Strumolo et al. |
| 2012/0186887 | A1* | 7/2012 | Moriguchi ............. A01D 69/02 180/65.1 |
| 2014/0262560 | A1 | 9/2014 | Dwyer |

FOREIGN PATENT DOCUMENTS

| | | | |
|---|---|---|---|
| CN | 101821149 A | | 9/2010 |
| EP | 2805598 A1 | | 11/2014 |
| GB | 2221880 A | | 2/1990 |
| JP | 2000356164 A | | 12/2000 |
| JP | 2002193142 A | | 7/2002 |
| JP | 2003304305 A | | 10/2003 |
| JP | 2007068515 A | | 3/2007 |
| WO | 2011108151 A1 | | 9/2011 |
| WO | WO-2011108151 A1 * | 9/2011 | ............. A01D 69/02 |

OTHER PUBLICATIONS

International Preliminary Report on Patentability of PCT/US2011/058235 dated Apr. 29, 2014, all enclosed pages cited.

* cited by examiner

STEERING ASSEMBLY INDICATOR SYSTEM FOR A LAWN CARE OR ZERO-TURN VEHICLE

CROSS-REFERENCE TO RELATED APPLICATIONS

This application is a continuation of U.S. application Ser. No. 14/354,752 filed Apr. 28, 2014, which is a national phase entry of International application number PCT/US2011/058235 filed Oct. 28, 2011, and the entire contents of all of the above are hereby incorporated herein by reference.

BACKGROUND

Lawn care tasks are commonly performed using various tools and/or machines that are configured for the performance of corresponding specific tasks. Certain tasks, like grass cutting, are typically performed by lawn mowers. Lawn mowers themselves, including walk-behind and riding lawn mowers, may have many different configurations to support the various needs and budgets of consumers.

By their very nature, riding lawn mowers include a steering device that is used to direct the movement of the riding lawn mowers. The steering device often takes the familiar form of a steering wheel on a tractor or steering levers on a zero-turn style mower.

From time to time there may be a need to provide some information to an operator while the operator is operating the lawn care vehicle. However, communicating with the operator can be difficult considering that the environment is usually noisy and that that the operator is usually focused on the lawn care task. Some lawn tractors have a small dashboard behind the steering wheel with one or two small gauges for providing limited information to the operator. However, the dashboard is often small and these gauges are often hidden behind the steering wheel and the operator's hands during operation of the lawn care vehicle. Many other types of lawn care vehicles, such as zero-turn lawn mowers, do not have any dashboard in front of the user. As such, these types of lawn mowers rarely try to provide visual information to an operator during operation of the vehicle.

BRIEF SUMMARY OF SOME EXAMPLES

Accordingly, in order to improve operator satisfaction in connection with using outdoor power equipment, some example embodiments may provide an indicator system for outdoor power equipment, such as for a riding lawn care vehicle. The indicator system may be mounted to the steering assembly, such as in the center of a steering wheel or on steering levers, and may be useful for providing alerts of specific events or conditions being detected, such as detection of general/safety faults (e.g., low fuel, no operator detected, etc.) or incoming electronic communications (e.g., a phone call, email, short range paging, etc.).

For example, [provide summary of zero-turn embodiment in fairly plain text].

In one example embodiment, a riding lawn care vehicle includes a first steering lever and an indicator system. The first steering lever may be coupled to a first wheel of the riding lawn care vehicle for steering the first wheel. The indicator system may include a first illuminating element that may be mounted to the first steering lever and may be configured to illuminate a predetermined color in response to detection of a predetermined trigger or condition thereby providing an alert to an operator of the riding lawn care vehicle.

In some embodiments, the indicator system also includes a display screen, and when the illuminating element lights up, the operator knows to look to the display screen which may display text corresponding to the outstanding alert.

In another example embodiment, a riding lawn care vehicle includes a steering assembly and an indicator system. The steering assembly may be coupled to a mechanism to move at least one wheel. Additionally, the indicator system may be mounted to a portion of the steering assembly and may include at least one illuminating element. The illuminating element may be configured to illuminate a predetermined color in response to detection of a predetermined trigger or condition occurring.

In another example embodiment, an indicator system may include a first illuminating element, a member configured for mounting the first illuminating element to a steering assembly of a riding lawn care vehicle, and a processor. The steering assembly may be coupled to a wheel directing movement of the riding lawn care vehicle. The processor may be configured to instruct the first illuminating element to illuminate a predetermined color in response to detection of a predetermined trigger or condition occurring.

Some example embodiments may improve the ability of operators and/or fleet managers to monitor various triggers, events and/or conditions regarding the operation of a riding lawn care vehicle.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1A:
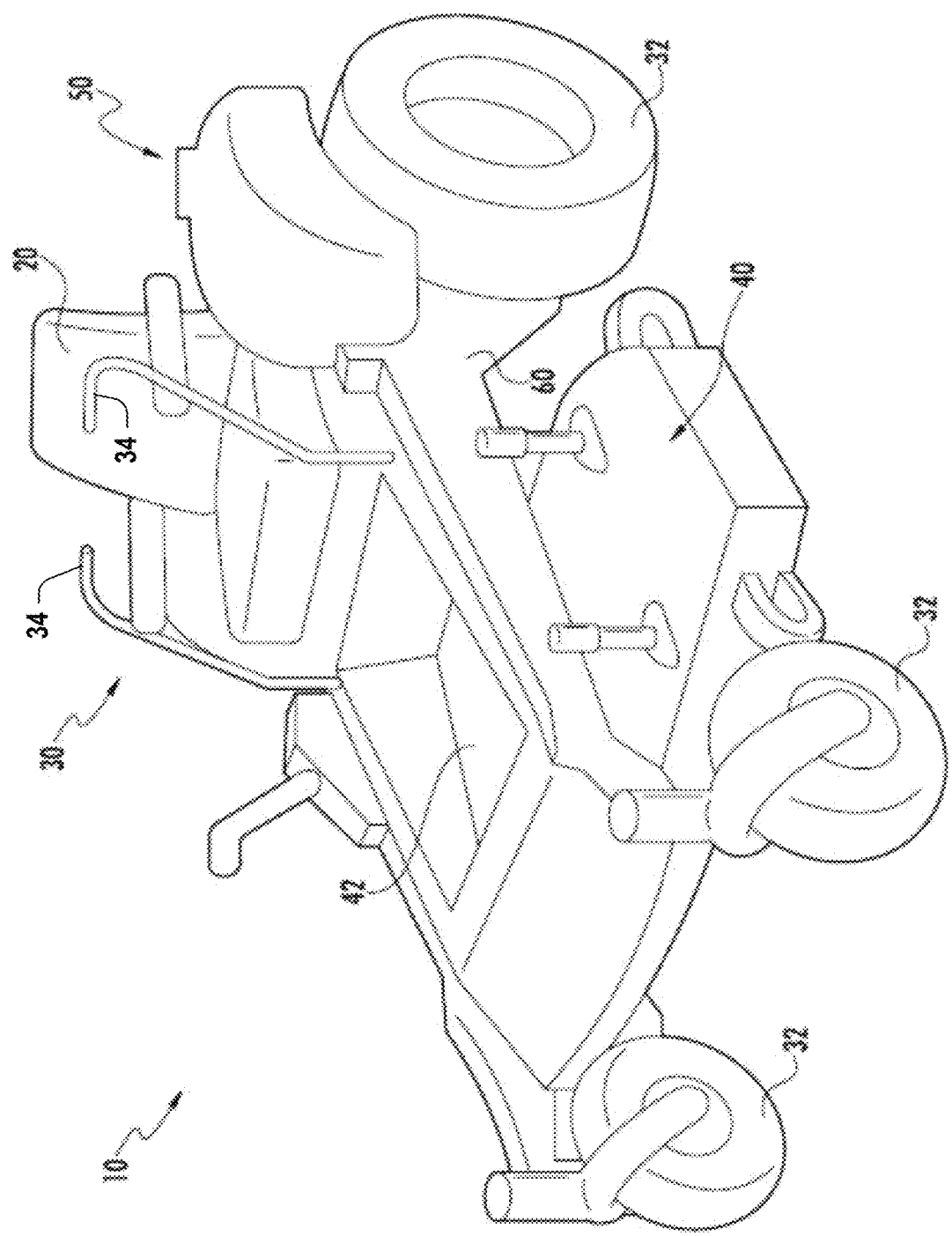
FIG. 1A illustrates a perspective view of a riding lawn care vehicle according to an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. Additionally, the term "lawn care" is meant to relate to any yard maintenance activity and need not specifically apply to activities directly tied to grass, turf or sod care. As used herein, operable coupling should be understood to relate to direct or indirect connection that, in either case, enables functional interconnection of components that are operably coupled to each other.

In an example embodiment, a riding lawn care vehicle, such as a riding lawn mower, includes an indicator system that is mounted to a steering assembly of the riding lawn care vehicle, such as to a steering lever or to a steering wheel. The indicator system may include an illuminating element and a display screen. The illuminating element may alert the operator of the riding lawn care vehicle by illuminating a predetermined color if a condition, event or trigger is detected. The illumination of the illuminating element may alert the operator to look at the display screen which may display textual information or instructions about the alert to the operator. The display screen may also be located on the steering assembly or may be located on some other part of the lawn care vehicle.

It should be understood that some aspects of the present disclosure may be applicable to any outdoor power equipment other than a riding lawn care vehicle, such as but not limited to a walk-behind mower, a snow-blower, a tiller, and/or the like. However, for ease of illustration and description, the figures and the related description of the present disclosure is described with respect to a riding lawn care vehicle according to some embodiments.

Figure 1B:
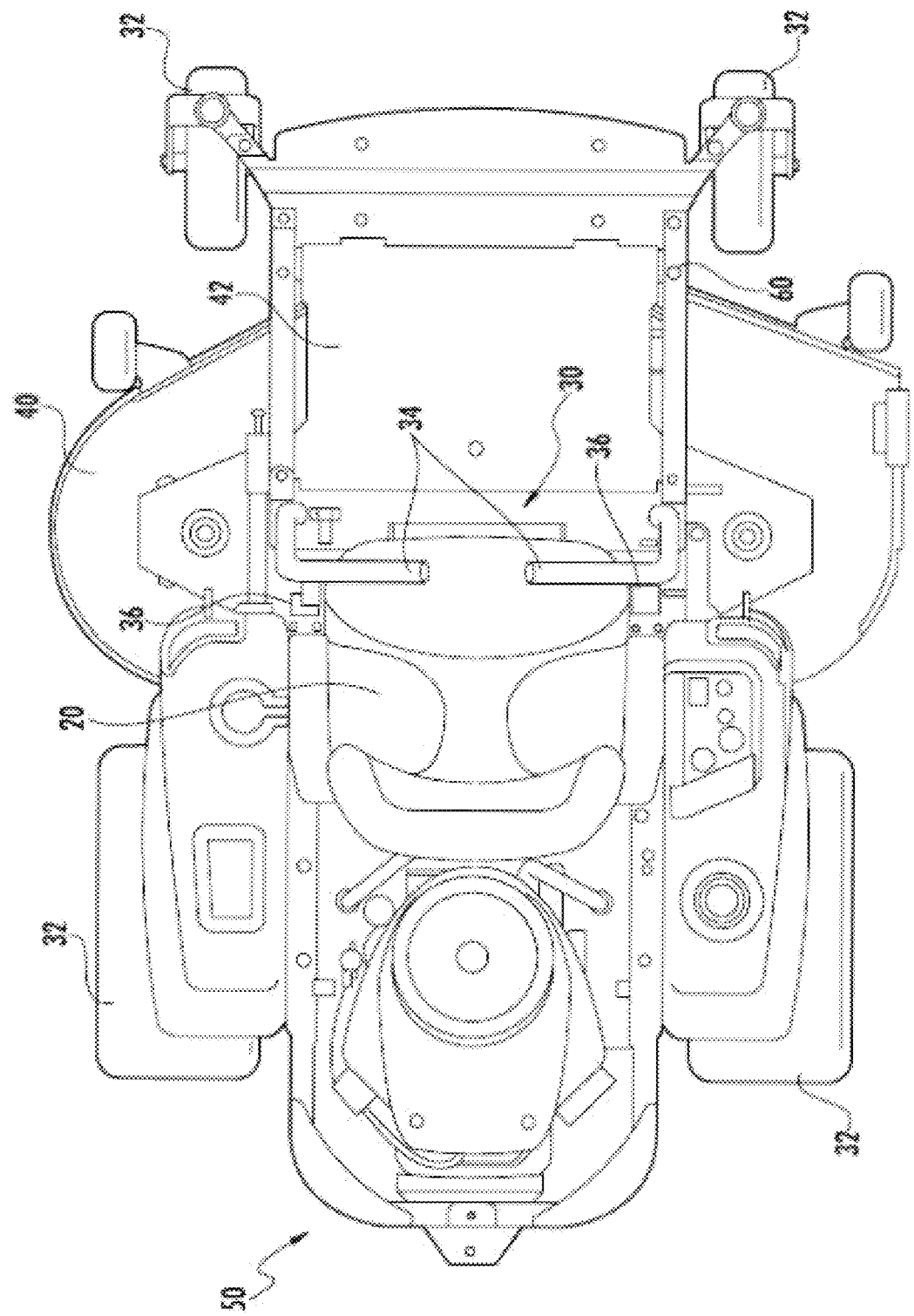
FIG. 1B illustrates a top view of the riding lawn care vehicle according to an example embodiment.

FIG. 1, which includes FIGS. 1A and 1B, illustrates a riding lawn care vehicle 10 having an adjustable steering assembly according to an example embodiment. FIG. 1A illustrates a perspective view of the riding lawn care vehicle 10 and FIG. 1B illustrates a top view of the riding lawn care vehicle 10 according to an example embodiment. In some embodiments, the riding lawn care vehicle 10 may include a seat 20 that may be disposed at a center, rear or front portion of the riding lawn care vehicle 10. The riding lawn care vehicle 10 may also include a steering assembly 30 (e.g., a set of zero turn mower steering levers 34 with shaft 36, or the like) functionally connected to wheels 32 of the riding lawn care vehicle 10 to allow the operator to steer the riding lawn care vehicle 10. The operator may sit on the seat 20, which may be disposed to the rear of the steering assembly 30 to provide input for steering of the riding lawn care vehicle 10 via the steering assembly 30. However, some models may be stand-up models that eliminate the seat 20. If the seat 20 is eliminated, the operator typically stands at an operator station proximate to the steering assembly 30.

The riding lawn care vehicle 10 may also include a cutting deck 40 having at least one cutting blade mounted therein. The cutting deck 40 may be positioned behind the front pair of wheels 32 in a position to enable the operator to cut grass using the cutting blade when the cutting blade is rotated below the cutting deck 40 when the cutting deck 40 is in a cutting position. However, in some alternative examples, the cutting deck 40 may be positioned in front of the front pair of wheels 32. In some embodiments, a footrest 42 may also be positioned above the cutting deck 40 forward of the seat 20 to enable the operator to rest his or her feet thereon while seated in the seat 20. In embodiments that do not include the seat 20, the footrest 42 may be the operator station from which a standing operator controls the riding lawn care vehicle 10. When operating to cut grass, the grass clippings may be captured by a collection system, mulched, or expelled from the cutting deck 40 via either a side discharge or a rear discharge.

In the pictured example embodiment, an engine 50 of the riding lawn care vehicle 10 is disposed to the rear of a seated operator. However, in other example embodiments, the engine 50 could be in different positions such as in front of or below the operator. As shown in FIG. 1, the engine 50 may be operably coupled to one or more of the wheels 32 to provide drive power for the riding lawn care vehicle 10. The engine 50, the steering assembly 30, the cutting deck 40, the seat 20 and other components of the riding lawn care vehicle 10 may be operably connected (directly or indirectly) to a frame 60 of the riding lawn care vehicle 10. The frame 60 may be a rigid structure configured to provide support, connectivity and interoperability functions for various ones of the components of the riding lawn care vehicle 10.

The steering assembly 30 may include steering levers 34 and a shaft 36. In some example embodiments, the steering assembly 30 may be embodied as an assembly of metallic or other rigid components that may be welded, bolted or otherwise attached to each other and operably coupled to the wheels 32 of the riding lawn care vehicle 10 to which steering inputs are provided. For example, the steering assembly 30 may include or otherwise be coupled with hydraulic motors that independently power drive wheels on each respective side of the riding lawn care vehicle 10. When a steering lever 34 is pushed forward (e.g., away from the operator towards the front of the vehicle), the corresponding hydraulic motor may drive the corresponding wheel forward. When a steering lever 34 is pulled backward (e.g., toward the operator as shown by the directional arrows in FIG. 5), the corresponding hydraulic motor may drive the corresponding wheel backward. Thus, when both steering levers 34 are pushed forward the same amount, the riding lawn care vehicle 10 travels forward in substantially a straight line since approximately the same amount of forward drive input is provided to each drive wheel. When both steering levers are pulled back the same amount, the riding lawn care vehicle 10 travels backward in substantially a straight line since approximately the same amount of rearward drive input is provided to each drive wheel. When one steering lever 34 is pushed forward and the other steering lever is pulled back, the riding lawn care vehicle 10 begins to turn in a circle. Steering right and left may be accomplished by providing uneven amounts of input to the steering levers. Other steering control systems may be employed in some alternative embodiments.

Figure 2:
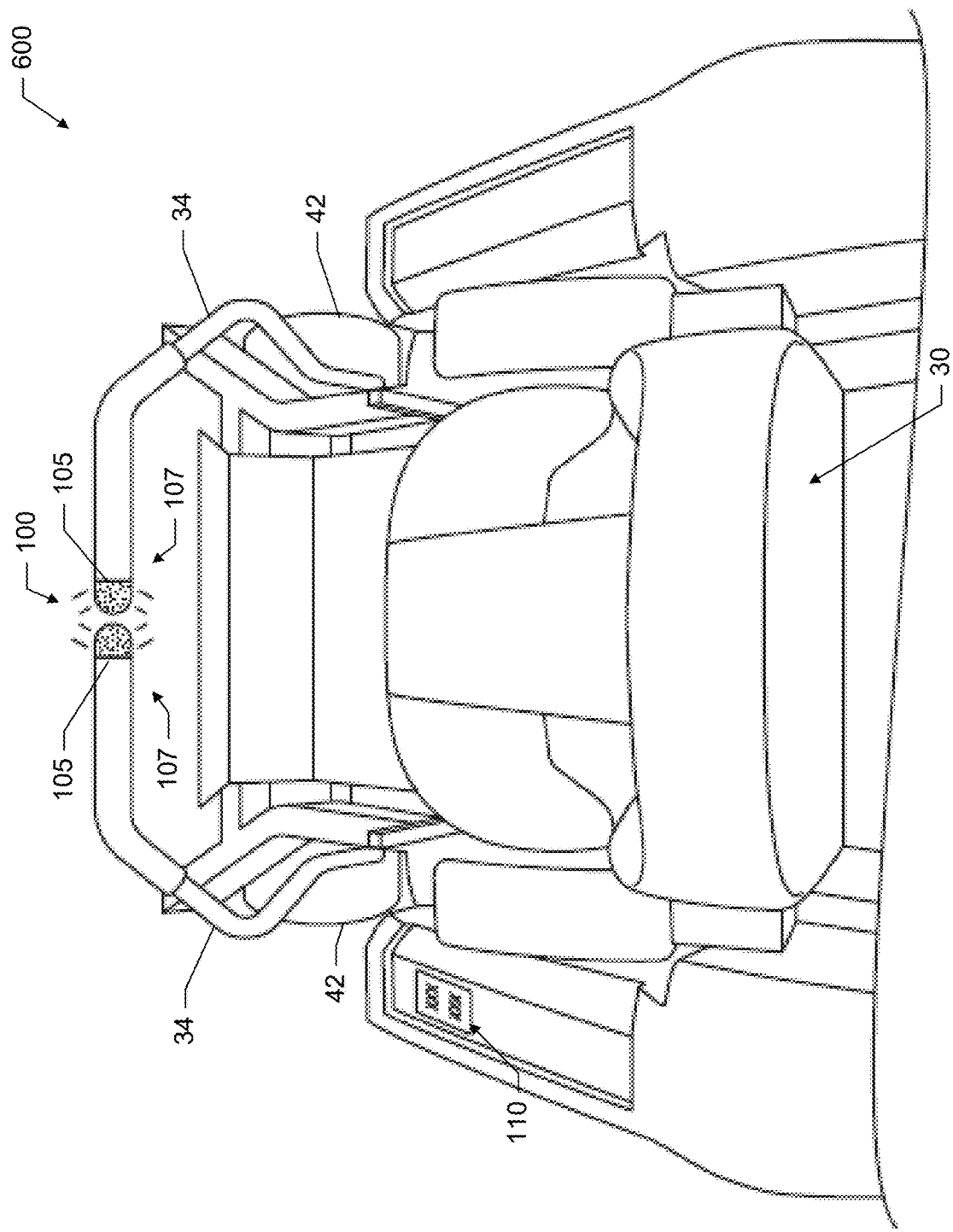
FIG. 2 illustrates a back perspective view of the riding lawn care vehicle including an indicator system according to an example embodiment.

FIG. 2 illustrates a back perspective view of the riding lawn care vehicle 10 according to an example embodiment. The riding lawn care vehicle 10 includes an indicator system 100 that alerts or notifies the operator based on various predefined triggers. The indicator system 100 may include one or more illumination elements 105 and/or one or more display screens 110. The illuminating elements 105 of the indicator system 100 include a light source that is configured to glow in response to a particular type of event, trigger or detected condition. The illuminating elements 105 may alert the operator to a particular condition just by virtue of their illumination or may alert the operator more generally to a number of possible conditions by causing the operator to turn his or her attention to the display screen where more detailed information about a particular condition may be displayed.

In some embodiments of the invention, the illuminating elements 105 are configured to glow a predetermined color depending on the type of event, trigger or condition detected, such as if there is a safety fault, general fault, an occurrence of a predefined trigger, etc. Further, when such event, trigger or condition is detected, in addition to the illuminating element 105 illuminating as any one of a plurality of colors, such as green, red, blue, green, any other color, or any combination thereof, the display screen 110 may display some more detail about the particular alert. In this regard, each color may be associated with a different event, trigger or condition and the display would be adjusted accordingly. For example, the indicator may glow a negative-alert color (e.g., red) whenever there's an immediate safety issue detected, and the display screen 110 may present text about the safety issue (e.g., "engine temp too high," "tractor riding on too steep of an incline," "no operator is detected," etc.). In another example, the riding lawn care vehicle 10 may be configured to communicate or pair with the operator's phone via a short range connection (e.g., Bluetooth® or the like), and the illuminating element 105 may glow blue (or other color indicating a neutral alert) whenever the operator is receiving an incoming call on his cellular telecommunications device, and the display screen 110 may display the name or number of the person calling.

In still other embodiments, the illuminating elements 105 may be configured to flash or otherwise change brightness levels based on the particular type of event, trigger or condition. For example, the illuminating elements 105 may glow solid when communicating information that does not require an operator response, but may flash when the operator needs to take some sort of immediate action.

The indicator system may have one or more illuminating elements 105. In the illustrative embodiment of FIG. 2, the indicator system 100 includes two illuminating elements, one in each steering lever. In such case, the illuminating elements 105 may both light up the same colors. In other embodiments, only one illuminating element 105 may light up at a time, the illuminating elements 105 may light up at different colors simultaneously indicating that two different alerts have been detected (or other conditions), the illuminating elements 105 may light up in a coordinated pattern, or the illuminating elements 105 can light up in any other manner/style/color/pattern to indicate an alert.

As mentioned above, the illuminating element 105 illuminates in response to detection of various predetermined conditions, triggers or events. Examples of such predetermined events, triggers or conditions are general faults (e.g., low fuel, service engine interval expires, the blades need sharpening, low oil/oil pressure, tire pressure error, engine heat warning, transmission heat warning, RPM too high or too low, blade speed too high or too low, parking brake engaged or disengaged, etc.), start or safety faults (e.g., steep incline, no operator detected, blades on, parking brake disengaged, etc.), incoming electronic communications alerts (e.g., incoming phonecall, incoming email/text message, incoming short range communications, etc.), or any other alerts/notifications (e.g., weather alerts/notifications, internet alerts, GPS notifications, garage door open, etc.). The events, triggers or conditions could be predetermined or predefined by the operator, the riding lawn care vehicle manufacturer or some other entity. Whenever an event, trigger or condition occurs, the illuminating element 105 illuminates in any one of a plurality of colors providing an alert or notification to the operator. The illuminating elements 105 can illuminate a first color to indicate a positive alert, a second color to indicate a negative alert, and a third color to indicate a neutral alert, where the first, second and third colors are all different from each other. For example, green may indicate a positive alert, red may indicate a negative alert, and blue may indicate a neutral alert.

The display screen 110 may be a liquid crystal display ("LCD"), a plasma display panel ("PDP"), an electroluminescence ("EL") display, a fluorescent display ("VFD"), light emitting diode ("LED") display, or any other display device. The display screen 110 can present detail about the outstanding alert, such as "ENGINE BRAKE FAULT," "LOW FUEL," "NO OPERATOR," or "BLADES ON," in conjunction with the illuminating element 105 glowing. In this regard, in some embodiments the illuminating element 105 acts to notify the operator of an alert and to turn the operator's attention to the display screen 110 so that the operator can read textual information about the notification or alert, such as alert instructional information, weather information, safety information, fault data. If no alert is outstanding, the display screen 110 may present other textual information to the operator, such as certain default gauges showing some operational data (e.g., voltage, RPM, use time, temperature, etc.), time/date information, etc. For example, if the indicator system 100 is in RPM mode, the display screen 110 presents the current RPMs of the riding lawn care vehicle 10.

One or more components of the indicator system 100 may be mounted to or integrated with a component of the steering assembly 30 and connected with processing circuitry. In the illustrative embodiment of FIG. 2, the illuminating elements 105 of the indicator system 100 are mounted to a distal end 107 of the steering levers 34. Providing illuminating elements 105 proximate the distal ends 107 of the steering levers 34 may be advantageous because they may be near the center of the operator's usual field of vision during operation of the vehicle 10 and may in an area that is not too often covered by the operator's hands during normal operation. However, it should be understood that the illuminating elements 105 are not necessarily limited to the illustrated location of FIG. 2 and thus, may be mounted to any location on the steering assembly 30, such as any position or location on the steering lever 34 or the shaft 36. In some embodiments of the invention, multiple illuminating elements 105 (e.g., a series of LEDs, light tubes, etc.) may be provided on each steering lever 34 in different locations to reduce the likelihood that the operator's hands will cover the illuminating elements 105.

In one embodiment, the display screen 110 is located separate from and remote from the illuminating element 105. For example, as shown in FIG. 2, the display screen 110 could be located on or adjacent to the operator's seat (e.g., on a side console, armrest, dashboard or the like) while the illuminating element 105 may be located on the steering levers 34 of the riding lawn care vehicle 10. It should be understood that, in some embodiments, the display screen 110 is not a required component of the indicator system 100, and the indicator system 100 could be only one or more illuminating elements 105, whereby the color of the illuminating element 105 or manner of illumination is immediately understood by an operator as to what the alert/notification is (or coupled be understood by the operator using a user manual, lookup table, or other vehicle information system).

Figure 3:
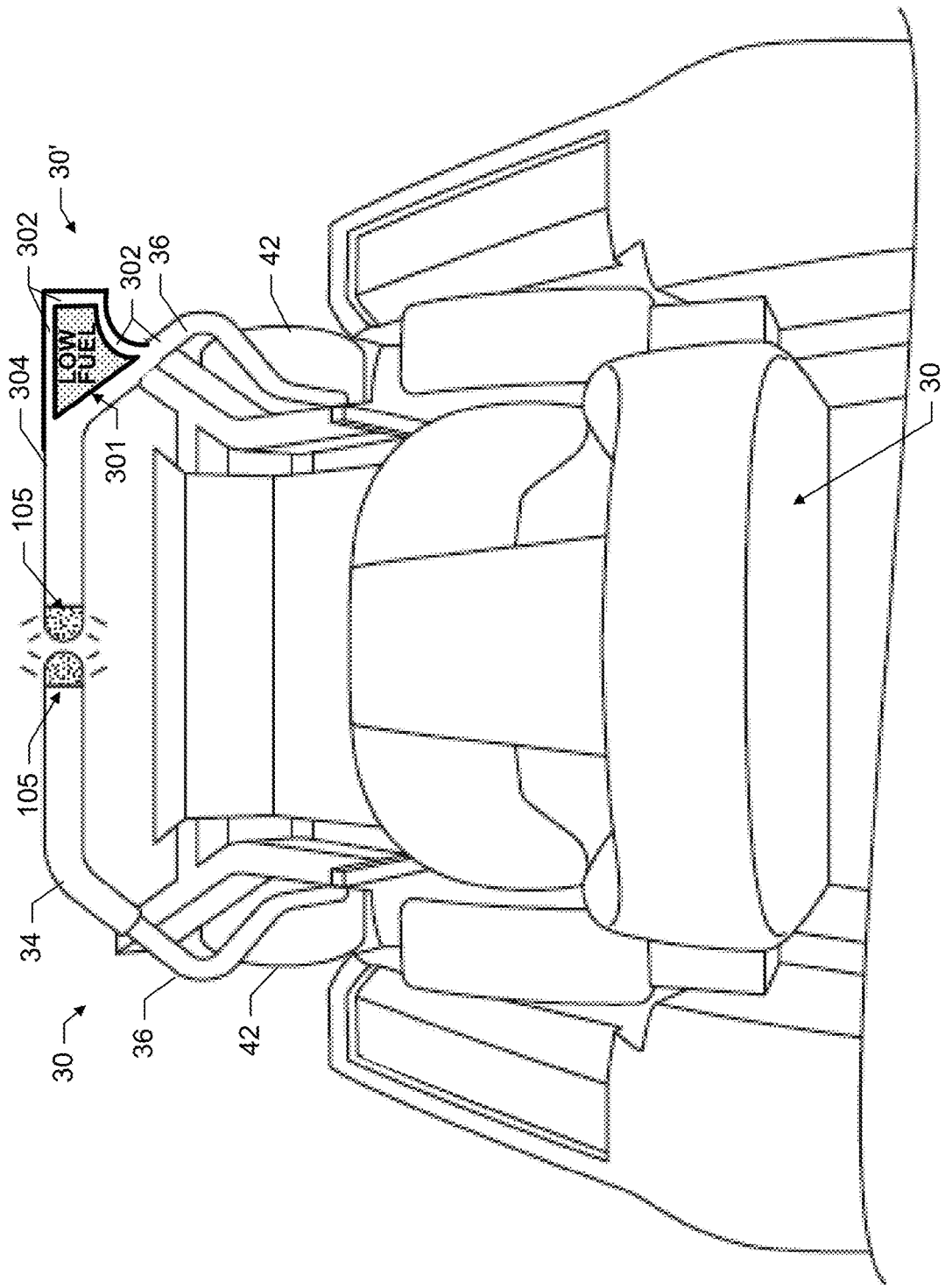
FIG. 3 illustrates a back perspective view of the riding lawn care vehicle including an indicator system according to another example embodiment.

In some embodiments, a display screen can be mounted to or integrated with any other area or component of the riding lawn care vehicle 10. For example, as illustrated in FIG. 3, the indicator system 100 includes illuminating elements 105 and a display screen 301, whereby the display screen 301 is mounted to or integrated with at least one steering lever 34. For example, the display screen 301 can be mounted using fasteners to a steering lever 304 (or the shaft 36) or the display screen 301 can be integrated thereto by manufacturing the shape of the steering lever 304 (or the shaft 36) to allow for securing a display screen 301 to be mounted within sidewalls 302 of the steering lever 304. The display screen 301 in FIG. 3 presents the text "Low Fuel" while the illuminating elements 105 illuminate in a red color.

In the illustrated embodiment shown in FIG. 3, the display screen 301 extends outward from one steering lever 34 and shaft 36. In this example, the steering lever 34 and shaft 30 comprise a generally horizontal portion (where the operator usually grips) that then bends downward toward the vehicle 10 less than ninety degrees. The shaft 36 then has another bend that takes the lever 36 to or beyond a vertical orientation. In this example, the display 301 extends from the area of the steering lever 34 between the first and second bends and is sized and oriented such that it does not extend significantly higher than the steering lever 34 or laterally beyond the outermost edge of the steering shaft 36 or vehicle 10. Such a configuration can allow for a relatively large display that may be less susceptible to being broken relative to other locations. However, it will be appreciated that the display screen 301 may be positioned at any location on the steering assembly 30' and may be connected with circuitry that is also connected with illuminating element 105. It should be understood that, in some embodiments, the illuminating elements 105 are not a required component of the indicator system 100, and the indicator system 100 could be only one or more display screens integrated into, for example, one or more steering levers 34.

Figure 4:
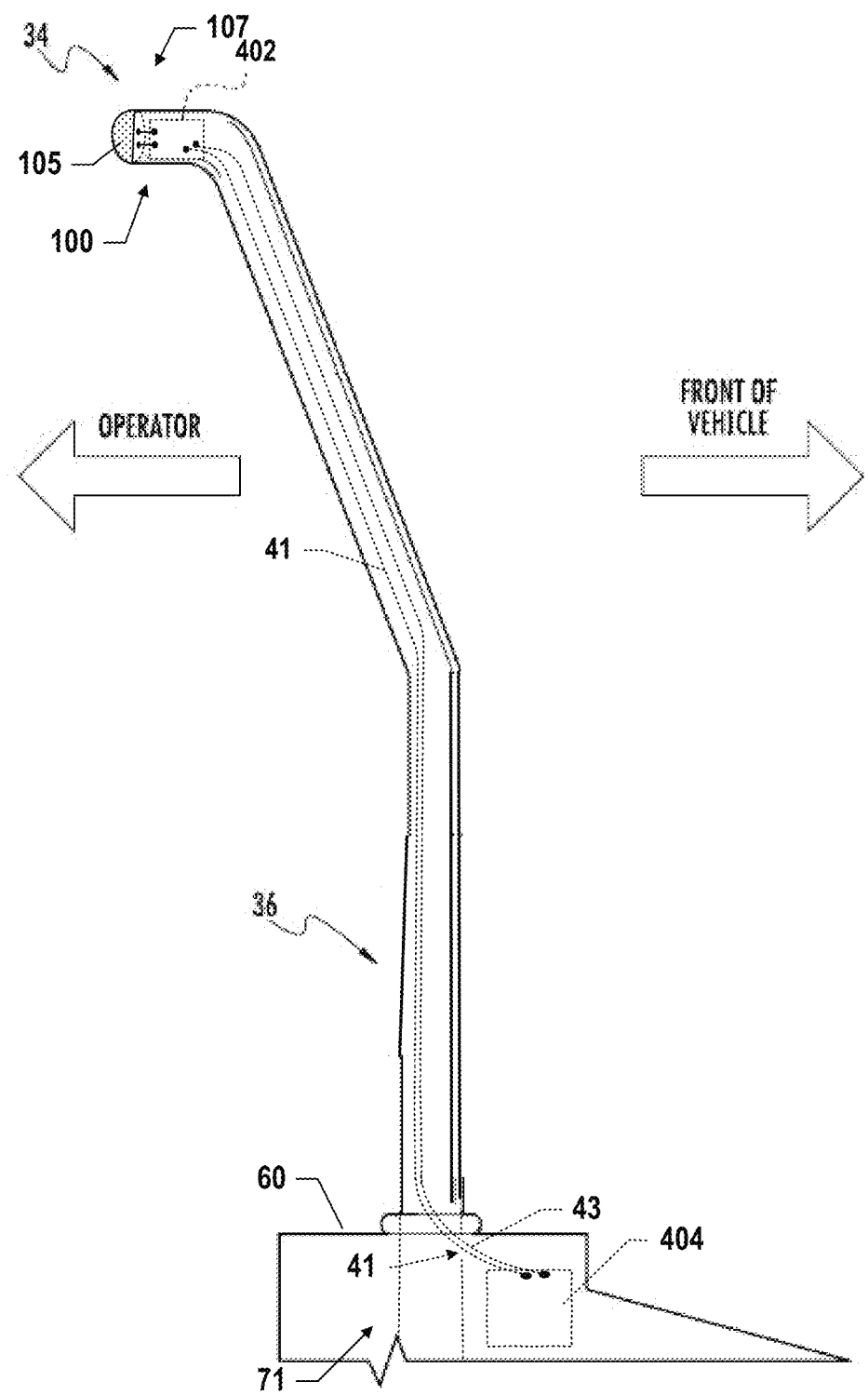
FIG. 4 illustrates the steering lever with an indicator system of the riding lawn care of FIG. 2 according to an example embodiment.

FIG. 4 illustrates a lever 34 of the riding lawn care vehicle of FIG. 2 according to an example embodiment. As illustrated, the illuminating element 105 is mounted to the steering lever 34. The illuminating element 105 is electrically connected with circuitry 402. Wiring 41 connects the illuminating element 105 via the circuitry (or directly) to a second or alternate set of circuitry 404 mounted elsewhere on the riding lawn care vehicle 10 apart from the steering lever 34. Circuitry 404 and/or 402 may include a computer system (discussed in more depth with regard to FIGS. 6-7) for controlling operations of the illuminating element 105 and also may include one or more power sources, such as a battery. In one embodiment, the power source may be connected with a solar power source (not shown) which may be mounted to the steering lever 34 and/or the shaft 36. Regardless, the wiring 41 extends down a hollow portion of the shaft 36. The shaft 36 may extend into the frame 60 of the riding lawn care vehicle 10. At a proximate end 71 of the shaft 36, the steering assembly 30 may be connected with a hinging device (not shown) which allows for the steering assembly 30 to be pivoted and therefore, allows the steering levers 34 to be moved to and from the operator or front of the vehicle. The wiring 41 extends through the hollow portion of the shaft 36 to an opening 43 in a sidewall of the shaft 36 so that the wiring may be connected to circuitry 404. Other wiring is also possible, such as allowing the wiring 41 to extend though the hinge.

Figure 5:
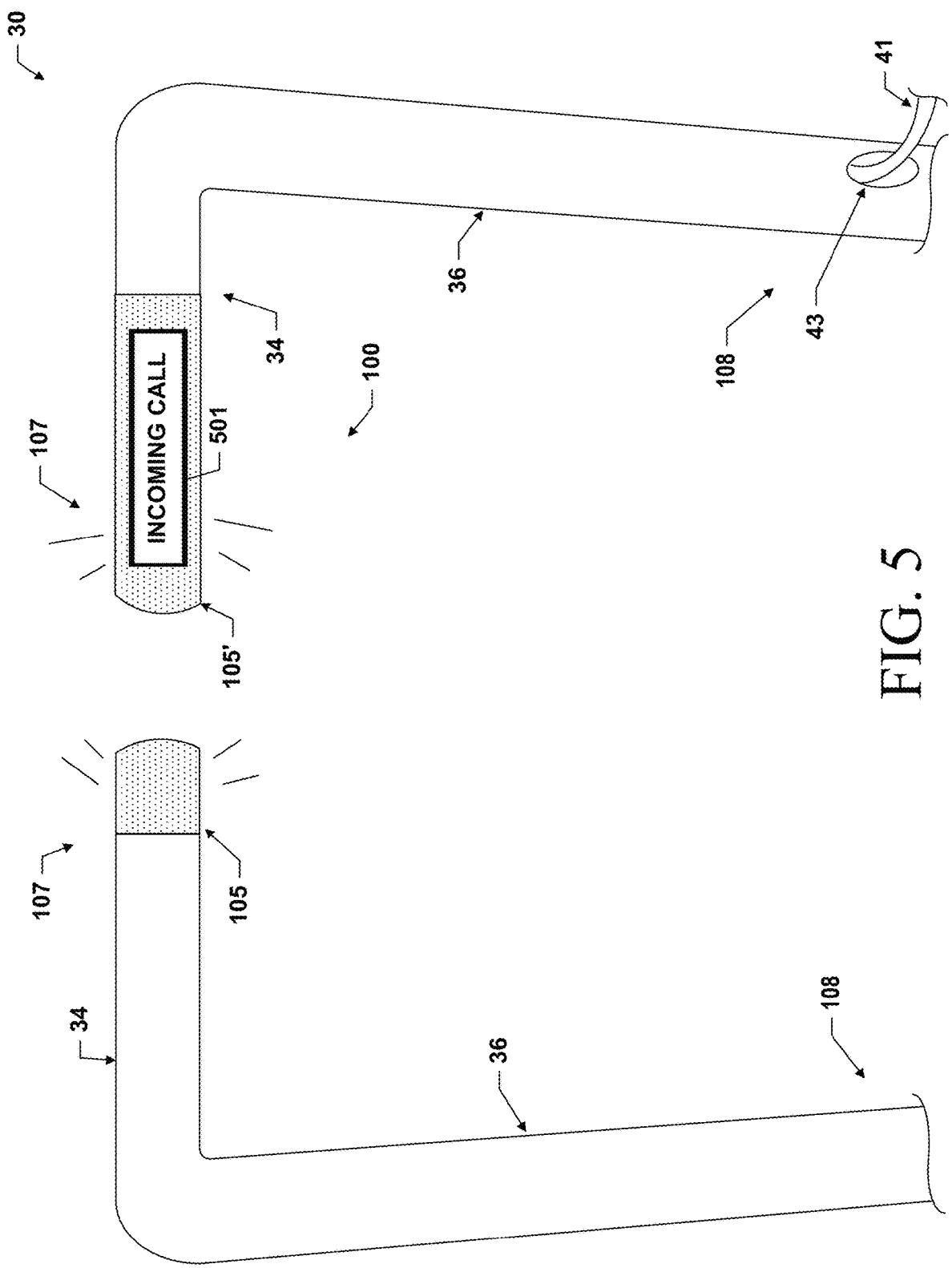
FIG. 5 illustrates a pair of steering levers with an indicator system of a riding lawn care vehicle according to an example embodiment.

FIG. 5 illustrates another embodiment of the indicator system 100 being mounted to the steering assembly 30, whereby the display screen 501 of the indicator system 100 may be mounted or integrated into the steering lever 34. Like FIG. 4, the illuminating elements 105, 105' of the illustrative embodiment of FIG. 5 are disposed at the distal end 107 of the steering assembly 30. In some such embodiments, the height of the display screen 501 itself may be smaller than the diameter of the steering lever 34 so that the display screen 501 can be incorporated into the steering lever 34 without interfering with the operator's grip on the steering lever. For example, each steering lever 34 may include a cushioned grip material surrounding the circumference of the steering lever proximate the distal end of the steering lever 34. One of these grips may include a thin rectangular cutout that exposes a display screen 501 coupled to the steering lever 34 and recessed below the outside of the cushioned grip so that it does not interfere with the operator's hand. Although the display screen 501 may be covered at times by the operator's hand, the operator can either periodically move his or her hand to see the display screen 501 or, in some embodiments, be alterted to something on the display screen 501 via the illuminating elements 105. However, it will be appreciated that display screen 501 may be mounted to the steering assembly 30 at any location, such as any location on the steering lever 34 or on the shaft 36. In another embodiment, the display screen 501 is mounted within at least one of the illuminating elements 105' in the steering lever 34.

The display screen 501 is configured to display details about an alert while at least one of the illuminating elements 105, 105' is illuminated. For example, as illustrated in FIG. 5, the illuminating elements 105, 105' illuminate as blue, which may indicate to the operator that an electronic communications has been received, and the display screen 501 of FIG. 5 recites "incoming call" and/or the telephone number of the incoming call, thereby providing more detail about the incoming electronic communications alert.

In one embodiment, one illuminating element 105' may be a different size or shape than the other corresponding illuminating element 105. For example, as illustrated in FIG. 5, the right illuminating element 105' is of sufficient shape and size to surround the periphery of the display screen 501. In one embodiment, a substantial portion of the steering lever 34 is an illuminating element 105'. In another embodiment, the illuminating element 105, 105' may be disposed along the complete length of the steering lever 34 and/or the shaft 36. For example, the illuminating element 105 could be a strip (not shown) of lighting that is mounted or integrated to the steering lever 34 and shaft 36 to extend from the distal end 107 of the steering assembly 30 to a proximate end 108 of the steering assembly.

The indicator system 100 may be wired using wires 43 that maybe be connected to the display screen 501 and illuminating elements 105. The wires 43 may be routed from the display screen 501 and illuminating elements 105, 105' through the hollow portion of the shaft 36. The wires 43 may exit out of an aperture 41 in a sidewall of the shaft 36 so that the wires 41 can then be connected to other components, such as a computing system, as previously mentioned. In some embodiments, the wires 43 exit proximate to or through the center of a hinge that hingedly couples the steering shafts 36 to the rest of the riding lawn care vehicle 10. As will be described in greater detail below with reference to FIG. 7, in some embodiments the illuminating elements and/or the display circuitry communicate wirelessly with other circuitry located elsewhere in the riding lawn mower so that it may not be necessary to run wires through the steering shafts 36 and hinges.

Figure 6:
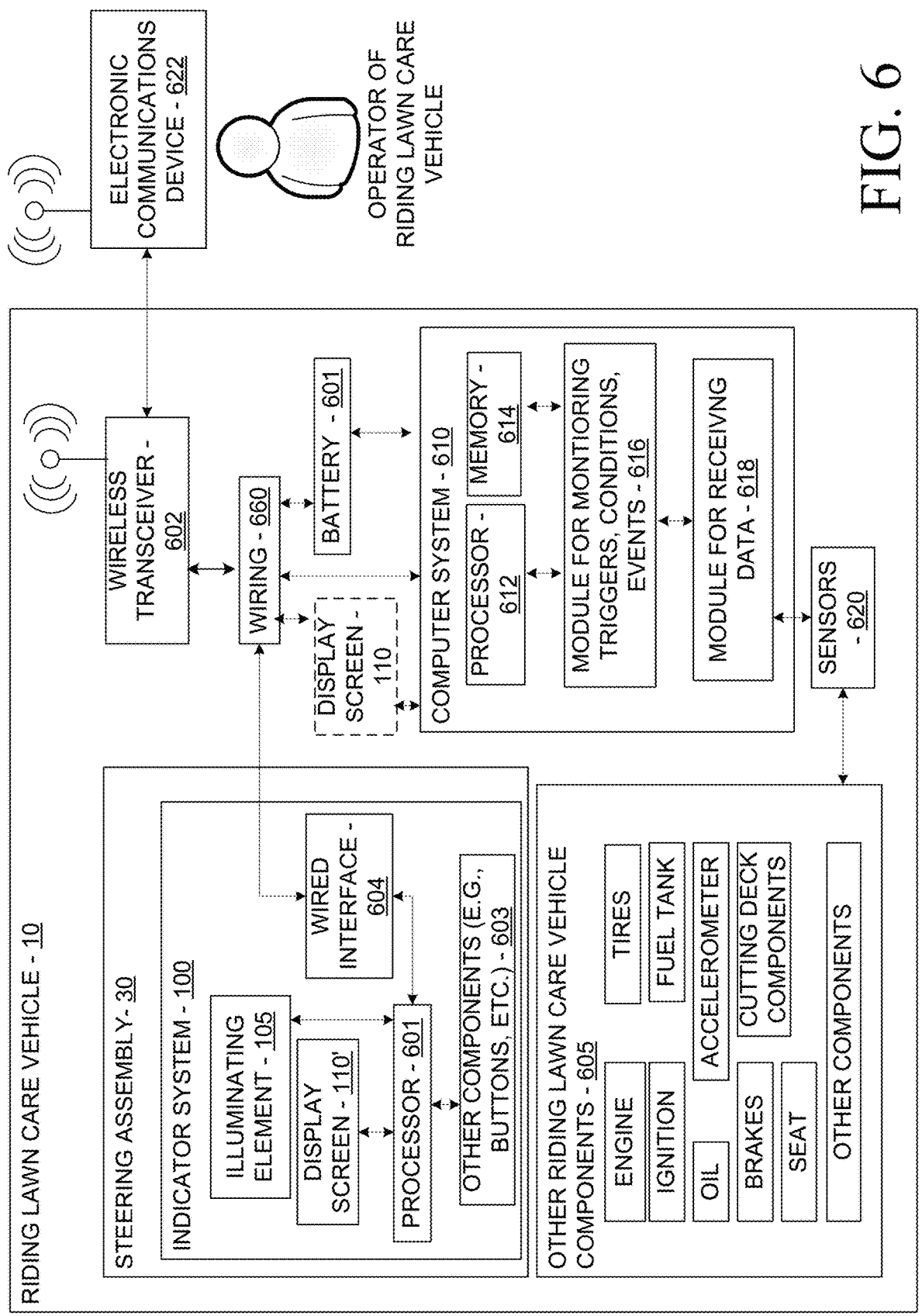
FIG. 6 illustrates a block diagram of a system of the riding lawn care vehicle that includes a wireless indicator system according to an example embodiment.

FIG. 6 illustrates a block diagram of a riding lawn care vehicle with an indicator system 100 having a wired interface 604. The indicator system 100 may communicate with a computer system 610 that determines the alerts and/or other data to be presented by the indicator system 100. The computer system 610 may be part of circuitry 402 or 404, and wiring 660 may be the same as the wiring 43 previously discussed for FIGS. 4-5. The wiring 660 may connect together any components of the riding lawn care vehicle 10, such as the computer system 610, battery 601, indicatory system 100 (via wired interface 604), sensors 620, separate display screen 110 and/or wireless transceiver 602. The wiring 660 may be run along the chassis or frame from the computer system 610 through the steering assembly 30 to the indicator system 100, as previously discussed. The computer system 610 may receive data from various components 605 (e.g., engine, ignition, tires, fuel tank, oil, oil or fuel filters, an on-board accelerometer to determine incline levels, brakes, seat, cutting deck components, wireless transceiver 602 and/or other components) via the sensors 620. The computer system 610 includes a processor 612 and memory 614 which is configured to communicate with a module for monitoring triggers, conditions, or events 616 and a module for receiving data 618. The module for receiving data 618 may receive data from the sensors 620 or from a wireless transceiver 602, and, with such data, the module for monitoring triggers, conditions, or events 616 determines if an alert should be triggered based on predetermined thresholds. These modules 616, 618 and other modules may be embodied in a non-transitory computer readable medium, such as memory 614 of the computer system or memory (not shown) of the indicator system 100.

If an alert is generated and/or if data should be displayed, the computer system 610 may relay the alert information and/or data to the indicator system via the wiring 660 to the indicator system's wired interface 604. The indicator system's wired interface 604 may then send such data to the indicator system's processor 601 which would, in turn, process the alert information and/or other data to various components of the indicator system 100, such as the illuminating element 105, the display screen 110, or other components 603.

A battery 601 may be used to power one or more components 605 of the riding lawn care vehicle, such as engine, ignition, an on-board accelerometer, sensors that determine data from the oil tank, fuel tank, cutting deck components, seat, brakes, etc., wireless transceiver 602, the computer system 610, and/or any other component which requires electricity to operate.

Figure 7:
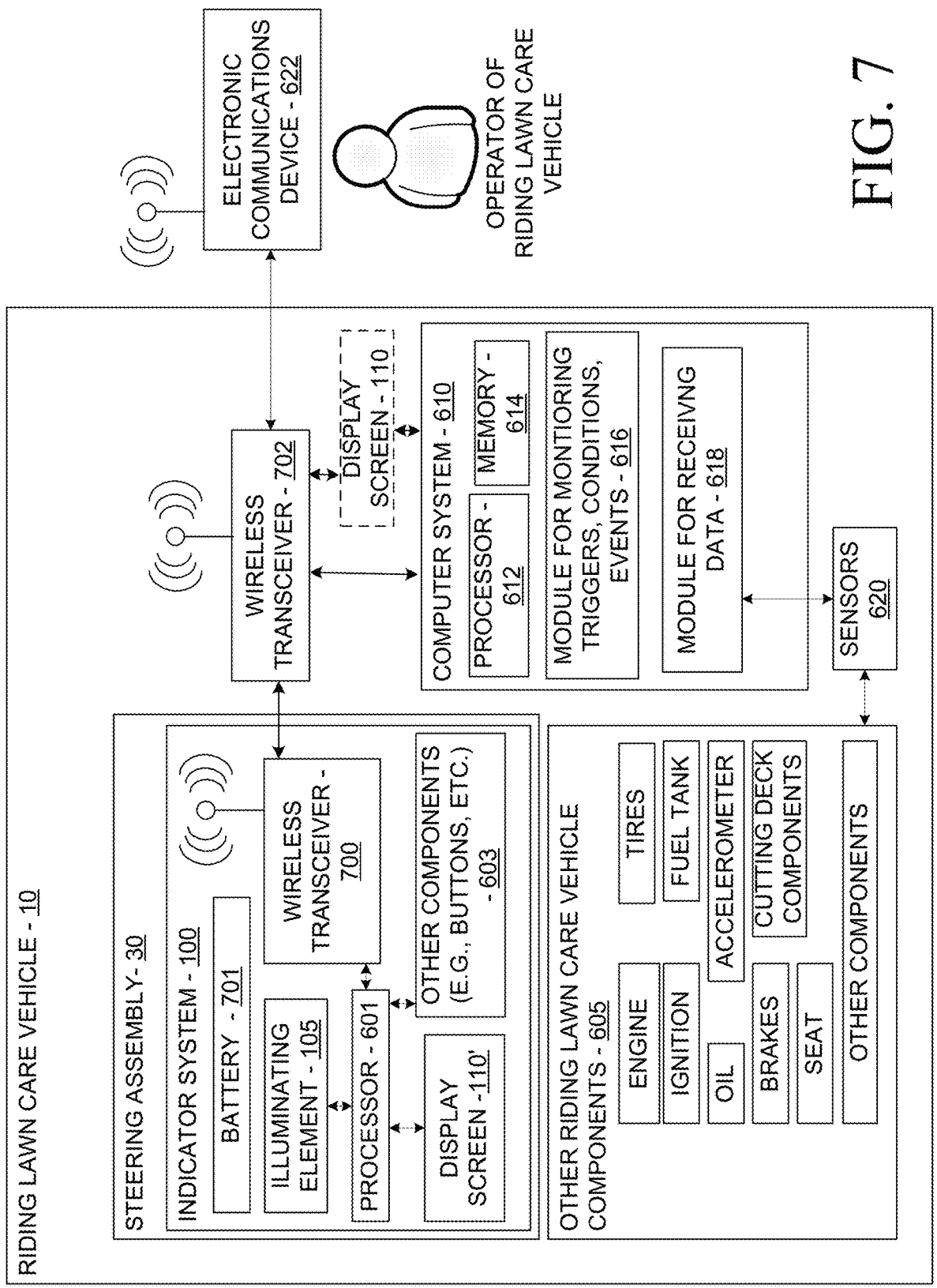
FIG. 7 illustrates a block diagram of a system of the riding lawn care vehicle that includes an indicator system according to another example embodiment.

As mentioned above, the computer system 610 may be mounted external to the steering assembly 30 and, as such, the wiring 41 may extend from the steering assembly 30 to the computer system 610. In another embodiment, the computer system 610 may be mounted within the steering assembly (e.g., lever 34) and thus, the wiring between the computer system 610 and the indicator system 100 need not extend outside of the steering assembly. However, in the embodiment where the computer system 610 is located on a portion of the chassis or frame 60 such that the computer system 610 is not proximate to the indicator system 100, the computer system 610 may communicate wirelessly with the indicator system 100. In this regard, FIG. 7 illustrates another exemplary block diagram of a riding lawn care vehicle with an indicator system 100 having a wireless transceiver 702, as opposed to the wired interface 604 of FIG. 6. FIG. 7 is therefore similar to FIG. 6 in that the computer system 610, the riding lawn care vehicle components 605, sensors 620 and some components of the indicator system 100 are the same as those in FIG. 6. However, in FIG. 7, the riding lawn care vehicle 10 has a wireless transceiver 702 that wirelessly communicates data between the indicator system 100 and the computer system 610 (and/or separate display screen 110). Particularly, if an alert is generated and/or if data should be displayed, the computer system 610 may relay the alert information and/or data to the indicator system from a general wireless transceiver 702 to the indicator system's wireless transceiver 700. The indicator system's wireless transceiver 700 may then send such data to the indicator system's processor 601 which would, in turn, process the alert information and/or other data to various components of the indicator system 100, such as the illuminating element 105, the display screen 110, or other components 603. It should be understood that the wireless transceiver 702 may be mounted at any location on the riding lawn care vehicle 10, such as in the steering assembly housing, on a portion of the frame of the riding lawn care vehicle 10, or any other location or component of the riding lawn care vehicle 10. The use of wireless transceiver 702 avoids having to run wires to the indicator system 100. In the case that the indicator system 100 does communicate data wirelessly, the indicator system 100 may be a battery 701 or, in one embodiment, could be powered by a solar cell system (not shown) that is mounted to or integrated with the levers 34.

Additionally, it should be noted that the wireless transceiver 702 may pair and communicate with an electronic communications device, such as a cellular phone, computer/laptop/tablet, or other device which has wireless communications capabilities, via a short range network (e.g., Bluetooth®). Other electronic communications could be received via a wireless systems to provide the indicator system 100 with various alerts, such as Emergency Broadcasting System alerts, weather notifications (e.g., whether a thunderstorm is imminent), breaking news feeds, or any other information that can be transmitted through the Internet. As another embodiment, the indicator system 100 can include a transceiver that would operate the operator's garage door the same as the garage door's remote control. The indicator system 100 may indicate to the operator whether the garage door is open or closed and the garage door remote transceiver would transmit a radio signal to open the garage door in response to the operator sending a signal from the garage door transceiver to the garage door system to open the garage door.

Figure 8:
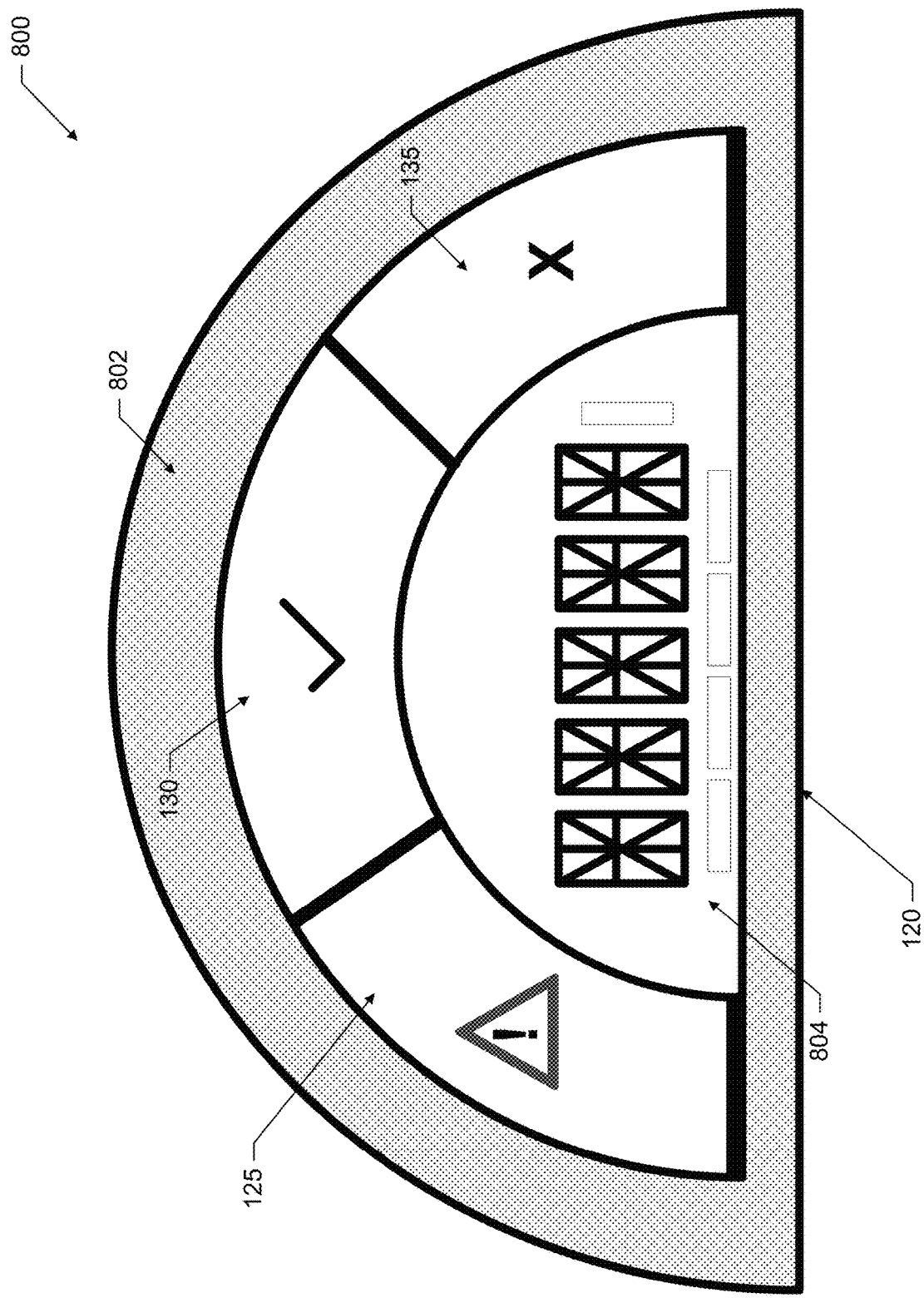
FIG. 8 illustrates an indicator system according to an example embodiment.
Figure 9:
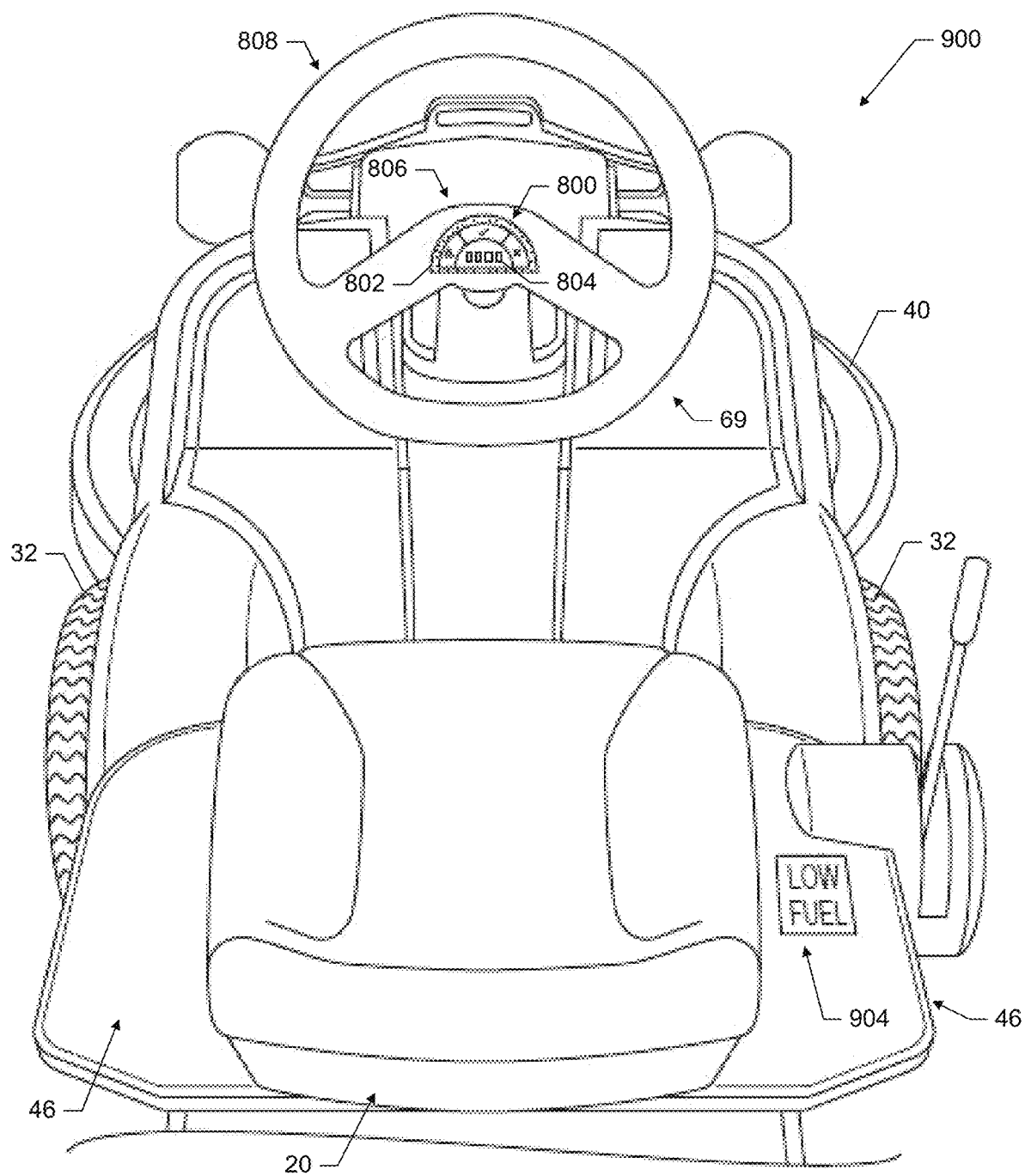
FIG. 9 illustrates a perspective view of a riding lawn care vehicle with a steering wheel including the indicator system of FIG. 8 according to an example embodiment.
Figure 10:
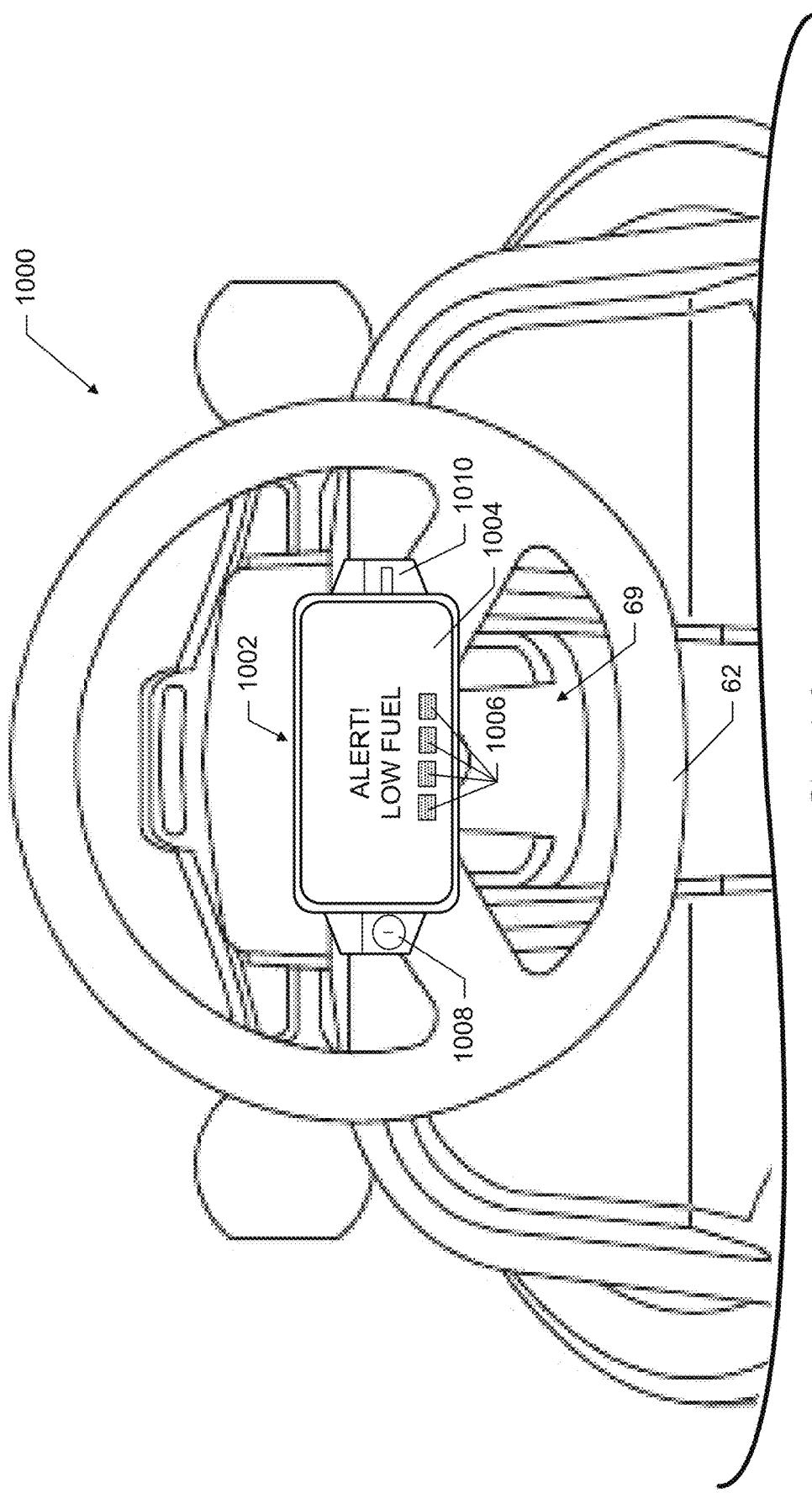
FIG. 10 illustrates a perspective view of a riding lawn care vehicle including an indicator system mounted to a steering wheel according to an example embodiment.

It should be noted that some embodiments of the indicator system 100 could have different configurations than those illustrated in FIGS. 2-7. FIG. 8 illustrates an indicator system 800 according to an example embodiment, and FIGS. 9-10 illustrate riding lawn care vehicles that include indicator systems 800, 1002 according to some embodiments. Many of the components of the riding lawn care vehicle 900, 1000 of FIGS. 9-10, such as the cutting deck 40, wheels 32 and seat 20, are substantially the same as those previously described for FIG. 1. However, the steering assembly 69 of the riding lawn care vehicle 900 of FIG. 9 is different from the embodiment illustrated in FIG. 1, in that the steering assembly 69 of FIG. 9 has a steering wheel 62 which controls the direction that the wheels 42 point. The indicator systems 800, 1002 of FIGS. 9-10 may be mounted or integrated to the steering wheel 62 of the riding lawn care vehicle 900, 1000.

The indicator system 800 of FIG. 8 may include an illuminating element 802, one or more buttons or indicator elements 125, 130, 135, and/or a display screen 804. Components of the indicator system 800 may be housed together in housing 120 and may be connected with processing circuitry. In an example embodiment, the housing 120 may include contacts via which connection may be made to power systems of the riding lawn care vehicle 900 and/or via which connection may be made to a sensor network of the riding lawn care vehicle 900.

In one embodiment, the illuminating element 802 includes a light source that surrounds a periphery of the display screen 804 and/or other elements, as is illustrated in FIG. 8. As will be discussed in more depth later with regard to FIG. 12, the illuminating element 802 is configured to glow a predetermined color depending on the type of event, trigger or condition detected, such as if there is a safety fault, general fault, a predefined trigger occurs, etc. Further, when such event, trigger or condition is detected, the illuminating element 802 can illuminate as any one of a plurality of colors, such as green, red, blue, green, any other color, or any combination thereof, and the display screen 804 may display some more detail about the particular condition. Each color may be associated with a different event, trigger or condition. The illuminating element 802 of FIG. 8 may be operated substantially the same as illuminating element 105 of FIGS. 1-7. For example, the illuminating element 802 of FIG. 8 may glow red and/or flash whenever there's an immediate safety issue detected (e.g., a negative alert), glow green whenever there are not outstanding alerts (e.g., a positive alert), or glow blue if there is a general/neutral alert (e.g., if there is an incoming telephone call).

As mentioned above, the indicator system 800 may also include one or more buttons, such as an override button 125, a mode select button 130, and/or any other type of button allowing for any other functionality. The override button 125 may allow for a user to override one or more alerts presented by the indicator system 800. Once an operator depresses the override button 125 where an override is allowed for the outstanding alert or notification, the operator may hold the override down for a predetermined time period and, in response thereto, the outstanding alert or notification is temporarily or permanently removed such that the illuminating element no longer displays the color associated with such outstanding alert or notification. The override button 125 may also (or alternatively) have other functionality, such as functioning as a reset button or an "enter" button. The mode select button 130 allows for an operator to toggle what is displayed in the display screen 804. Various modes that are possible include, but are not limited to, RPM mode, time mode, temperature mode, hour meter mode, trip time mode, and inclinometer mode. Other buttons or indicators may also be employed on the indicator system 800. For example, as illustrated in FIG. 8, an indicator element 135 may provide to the operator an indication of one or more features that are currently active, such as indicating that the riding lawn care vehicle 800 is currently in reverse mow mode.

The display screen 804 of FIG. 8 may be similar to the display screen 110 of FIG. 2 and thus, may present various textual information to the operator, such as operational data (e.g., voltages, RPMs, trip timer, etc.), weather information, safety information, fault data, time/date information, etc. Also, the display screen can present various status information of the indicator system 100", such as "READY," "FAULT," "ENGINE BRAKE FAULT," "LOW FUEL," "NO OPERATOR," or "BLADES ON." In one embodiment, the display screen 804 is mounted within housing 120. It should be understood, however, that the display screen 804 need not be located within the housing 120 of the indicator system 800, and one embodiment is directed to having a display screen 804 located separate from the housing and remote from the illuminating element 105', similar to that of FIGS. 2-3.

As mentioned above, the indicator system 800 may be disposed in steering assemblies other than those described with regard to FIGS. 1-7. For example, FIGS. 9-10 illustrate indicator systems 800, 1002 being disposed in a steering wheel 62 of a riding lawn mower 900, 1000 that has the engine disposed in front of the steering column. In FIG. 9, the indicator system 800 of FIG. 8 is mounted to or integrated into a center portion 806 of the steering wheel 62 or otherwise positioned to fit within the circumference of the steering wheel 62. According to another example embodiment, the indicator system 800, 1002 could be positioned on the circumference portion 808 of the steering wheel 62 instead of in the center 806 of the wheel. The indicator system 800, 1002 can be integrated into the steering wheel 62 or be removable from the steering wheel 62 according to some embodiments.

The wiring for the indicator system 800, 1002 may run through the steering wheel and the steering column. In some embodiments, the indicator system 800, 1002 is embedded in the steering wheel and/or otherwise configured to rotate with the steering wheel. In other embodiments the indicator system 800, 1002 is configured so that it stays stationary and the steering wheel rotates around or just beneath the indicator system 800, 1002.

Additionally, as illustrated in FIG. 9, the indicator system 800 may further include a display screen 904 that is not adjacent to the illuminating element 802. The separate display screen 904 may be the only display screen of the indicator system 800 or may be in addition to the previously-discussed display screen 804. The separate display screen 904 is illustrated in FIG. 9 as mounted to the right fender 46 of the riding lawn care vehicle 900. However, the separate display screen 904 can be located at any other location on the riding lawn mower 900, such as on the seat, on a portion of the foot rest, a lever or any other location where an operator can view the display screen 904 when seated.

The separate display screen 904 may be connected with circuitry (or via a wireless connection) that is also connected with the illuminating element 802 such that when the illuminating element 802 is providing an alert or notification to the operator, the operator may direct his attention to the separate display screen 904 which may provide more detail about the alert or notification. For example, as illustrated in FIG. 9, when a low fuel alert occurs, the illuminating element 802 illuminates as a predetermined color, e.g., red, and the separate display screen 904 displays text indicating that that the vehicle has "Low Fuel." It should be understood that this status information may also (or in lieu of) be displayed by the display screen 804 that is immediately proximate to the illuminating element 802.

FIG. 10 illustrates a back perspective view of a portion of a riding lawn care vehicle 1000 including another indicator system 1002 according to another example embodiment. The indicator system 1002 of FIG. 10 includes a display screen 1004 and an illuminating element 1006 which is integrated into the display screen 1004. The indicator system 1002 of FIG. 10 also includes buttons/indicators 1008 and 1010 which may correspond to the buttons/indicators 125, 130, 135 previously discussed with regard to FIG. 8. Additionally, the buttons/indicators 1008 and 1010 may also include powering on/off functionality. The indicator system 1002 operates substantially the same as the indicator system 800 of FIG. 8 in that the illuminating elements 1006 illuminate indicating an alert and the display screen 1004 may present detail about the alert in response to a predetermined event, condition or trigger being detected. One embodiment of this process is discussed in more depth below with regard to FIG. 11.

Figure 11:
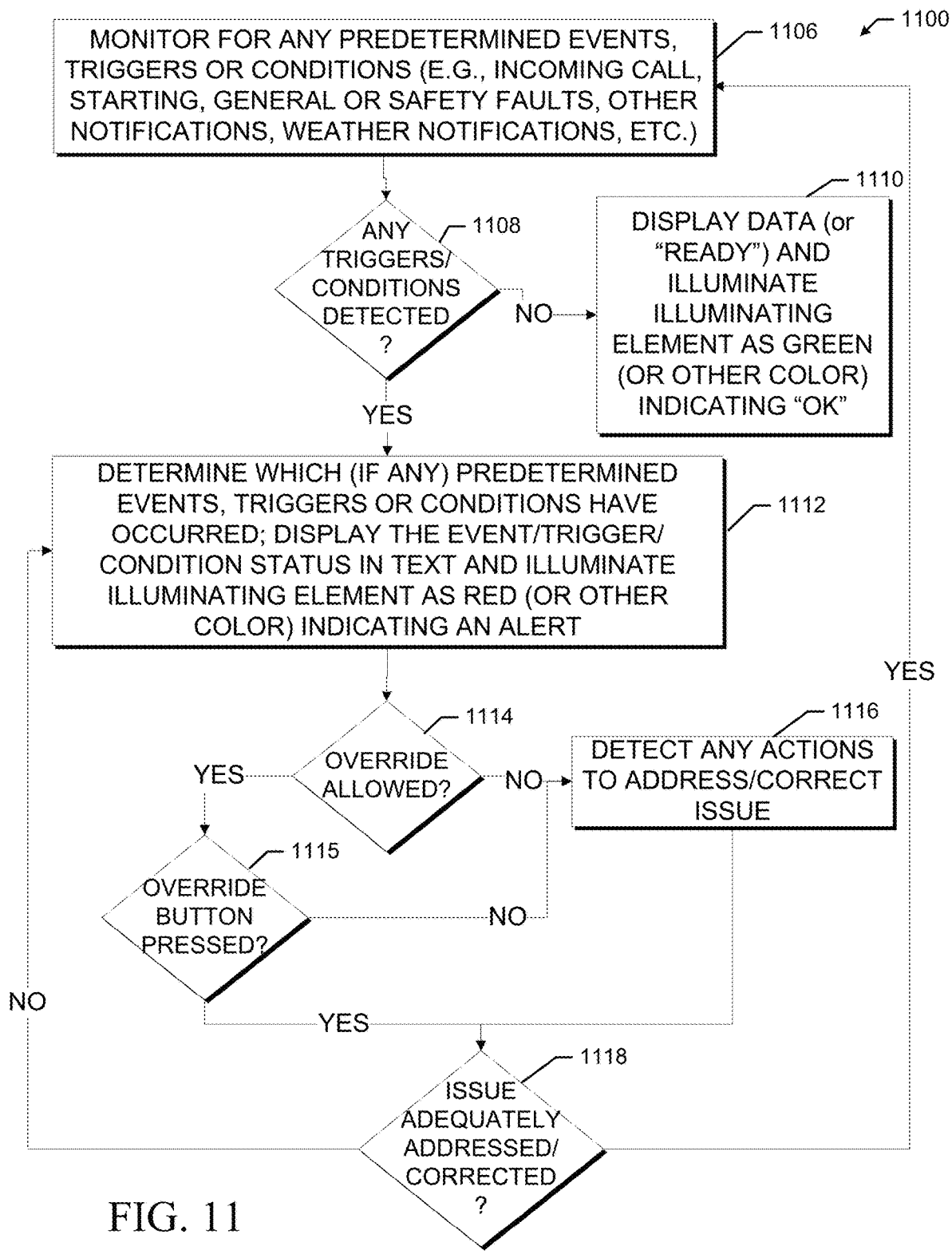
FIG. 11 illustrates a method of operation of an indicator system according to some example embodiments.

FIG. 11 is a block schematic diagram of a method 1100 of operation of the indicator system 100 according to one embodiment. In block 1106, the riding lawn care vehicle is monitored to determine if any predetermined events, triggers or conditions are outstanding. As previously mentioned, examples of predetermined events, triggers or conditions are general faults (e.g., low fuel, service engine intervals, sharpen blades, low oil/oil pressure, tire pressure, engine heat warning, transmission heat warning, etc.), safety faults (e.g., steep incline, no operator, etc.), electronic communications alerts (e.g., incoming phonecall, incoming short range communications, emails, calendar reminders, text messages, pages, etc.), and/or any other alerts (e.g., weather alerts, breaking news alerts, emergency broadcasting system alerts, internet alerts, garage door open, etc.). The determination of block 1108 may be performed by the module for monitoring triggers, conditions, or events 616 of FIGS. 6-7.

If no predetermined events, triggers or conditions have been determined to have occurred, the method 1100 may continue to block 1110. In block 1110, the illuminating element illuminates as a first predetermined color (e.g., green) providing a positive alert indication, and the display screen may display current mode data, which provides confirmation that no alerts are outstanding.

On the other hand, if predetermined events, triggers or conditions have been determined to have occurred in block 1108, the method 1100 may proceed to block 1112 where the alert status is displayed in text on the display screen and the illuminating element illuminates a second predetermined color (e.g., red) providing a negative alert indication to the operator that a predetermined event, trigger or condition has occurred, where the second predetermined color is different from the first predetermined color.

In block 1114, a determination is made as to whether the generated outstanding alert can be overridden. This determination may be made by the indicator system accessing pre-stored information indicating which alerts may be overridden and which alerts may not be overridden. If the generated outstanding alert cannot be overridden, the method 1100 may continue to block 1116; otherwise, the method 1100 may proceed to block 1115 where a determination is made as to whether the override button 125 has been depressed (or activated). If the override button has been depressed (or activated), then the method 1100 may proceed to block 1118; otherwise, the method may continue to block 1116. In block 1116, the riding lawn care vehicle is monitored to detect if any action has been performed to address or correct the issue, or if the issue has been self-corrected. In block 1118, if the issue or outstanding alert has not been adequately addressed or corrected, the method 1100 may proceed back to block 1112 where the illuminating element remains lit indicating the alert is still outstanding. However, if the issue or outstanding alert has been adequately addressed or corrected, the method 1100 may return to block 1106 where diagnostic tests are performed again to determine if any other triggers, events or conditions have occurred.

The method 1110 of FIG. 11 may be applicable to any of the embodiments disclosed herein. For example, the method 1100 may be employed via the embodiments of FIGS. 2-10 and should not be limited to the embodiments of FIGS. 8-10.

It should be understood the operator could receive an electronic communications (e.g., a cellular telephone call, short range communications call, page notification, email, SMS or MMS message, calendar reminder, etc.) and the indicator system 100 detect such electronic call or message via a short range communication system (e.g., Bluetooth®). In response to detecting such incoming electronic communications, the indicator system would instruct the illuminating element to light up a third predetermined color associated with an electronic communications, such as blue. This third predetermined color for an incoming call alert may be different than the first and second predetermined colors (e.g., green or red, respectively) associated with positive or negative alerts.

In some embodiments, the incoming call could be a telephone call or a short range call. In the event that the call is a short range call, the operator may receive a call from a handheld device within a proximate range such as 100-200 yards. For example, if a caller has a short range wireless communications device and the operator of the riding lawn care vehicle has a receiver of the short range wireless communications system, the caller can call and the operator of the riding lawn care vehicle would be notified of a call via the indicator system since the indicator system would be paired with the operator's receiver.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A zero-turn vehicle comprising:
   a first drive wheel;
   a second drive wheel configured to drive at a different speed or in a different direction than the first drive wheel;
   a first lever configured to at least partially control speed or direction of the first drive wheel;

a second lever configured to at least partially control speed or direction of the second drive wheel; and an indicator system comprising:

an illuminating element disposed at a first end of a grip portion of the first lever, wherein the illuminating element is configured to illuminate in response to detection of a predetermined trigger or condition thereby providing an alert to an operator, and a display screen disposed at a second end of the grip portion of the first lever and configured to present textual information about the alert, wherein the first end and the second end of the grip portion of the first lever are remote from each other.

2. The zero-turn vehicle of claim 1, wherein the display screen is mounted within sidewalls of the first lever.

3. The zero-turn vehicle of claim 1, wherein the display screen extends outwardly away from the second end of the grip portion of the first lever.

4. The zero-turn vehicle of claim 1, wherein the grip portion is substantially horizontal, and wherein the first lever further comprises:

a vertical portion extending downward toward the zero-turn vehicle, and a transition portion comprising a first bend at a first end of the transition portion connected to the second end of the grip portion at a first angle of less than 90 degrees and a second bend at a second end of the transition portion connected to the vertical portion at a second angle of less than 90 degrees, wherein the display screen extends outwardly from the second end of the grip portion into the transition portion between the first bend and the second bend.

5. The zero-turn vehicle of claim 4, wherein an upper edge of the display screen is substantially flush with the second end of the grip portion of the first lever.

6. The zero-turn vehicle of claim 4, wherein an outer edge of the display screen does not extend past a vertical extension of the vertical portion of the first lever.

7. The zero-turn vehicle of claim 1 further comprising:

wiring extending through a hollow portion of the first lever operably coupling the display screen to a computing system associated with the zero-turn vehicle.

8. The zero-turn vehicle of claim 1, wherein the display screen has a smaller diameter than the first lever.

9. The zero-turn vehicle of claim 1, wherein the illuminating element is configured to be illuminated while the textual information about the alert is presented on the display screen.

10. The zero-turn vehicle of claim 1, further comprising:

a second illuminating element being integral to a second grip portion of the second lever and being configured to illuminate in response to the detection of the predetermined trigger or condition.

11. The zero-turn vehicle of claim 10, wherein the illuminating element is a different size or shape than the second illuminating element.

12. The zero-turn vehicle of claim 1 further comprising:

a wireless communication device configured to communicate with a mobile device, wherein the predetermined trigger comprises detecting that the mobile device is receiving at least one of:

a cellular telephone call;

an incoming email;

a short range wireless communication call;

a text message;

a page; or a calendar reminder.

13. The zero-turn vehicle of claim 1, wherein the zero-turn vehicle comprises a riding lawn mower.

* * * * *